United States Patent [19]
Atanasyan et al.

[11] Patent Number: 5,487,269
[45] Date of Patent: Jan. 30, 1996

[54] METHOD FOR MONITORING THE EFFICIENCY OF A CATALYTIC CONVERTER FOR TREATING EXHAUST GASES FROM AN INTERNAL COMBUSTION ENGINE

[75] Inventors: Alain A. Atanasyan, Tournefeuille; Francis Tarroux, Portet S/Garonne, both of France

[73] Assignee: Siemens Automotive S.A., Toulouse Cedex, France

[21] Appl. No.: 232,228

[22] PCT Filed: Oct. 6, 1992

[86] PCT No.: PCT/EP92/02303

§ 371 Date: Jun. 22, 1994

§ 102(e) Date: Jun. 22, 1994

[87] PCT Pub. No.: WO93/09335

PCT Pub. Date: May 13, 1993

[30] Foreign Application Priority Data

Oct. 28, 1991 [FR] France ................................ 91 13237

[51] Int. Cl.⁶ .................................................. F01N 3/20
[52] U.S. Cl. ............................. 60/274; 60/276; 60/277; 60/285
[58] Field of Search .......................... 60/274, 276, 277, 60/285

[56] References Cited

U.S. PATENT DOCUMENTS

| | | |
|---|---|---|
| 4,622,809 | 11/1986 | Abthoff et al. . |
| 5,077,970 | 1/1992 | Hamburg .................................. 60/277 |

FOREIGN PATENT DOCUMENTS

| | | |
|---|---|---|
| 0466311 | 1/1992 | European Pat. Off. . |
| 0478133 | 4/1992 | European Pat. Off. . |
| 3524592 | 9/1986 | Germany . |
| 2178857 | 2/1987 | United Kingdom . |

*Primary Examiner*—Douglas Hart
*Attorney, Agent, or Firm*—Herbert L. Lerner; Laurence A. Greenberg

[57] ABSTRACT

An oxygen sensor, whose output signal switches between two levels, is arranged in the gas flow leaving the catalytic converter. During regulation at a stabilized speed, the injection time suitable for ensuring stoichiometry of the air/fuel mixture is determined. During a predetermined time interval a time variation of symmetric deviation, whose amplitude and shape is predetermined about a base injection time chosen from the determined injection time, is imposed on the injection time. The base injection time used during successive time intervals is modified progressively and in a monotonic manner so as to center the deviation of the injection time on that of the oxygen storage capacity of the catalytic converter. Catalyst efficiency is evaluated from an oscillation of this signal.

6 Claims, 3 Drawing Sheets

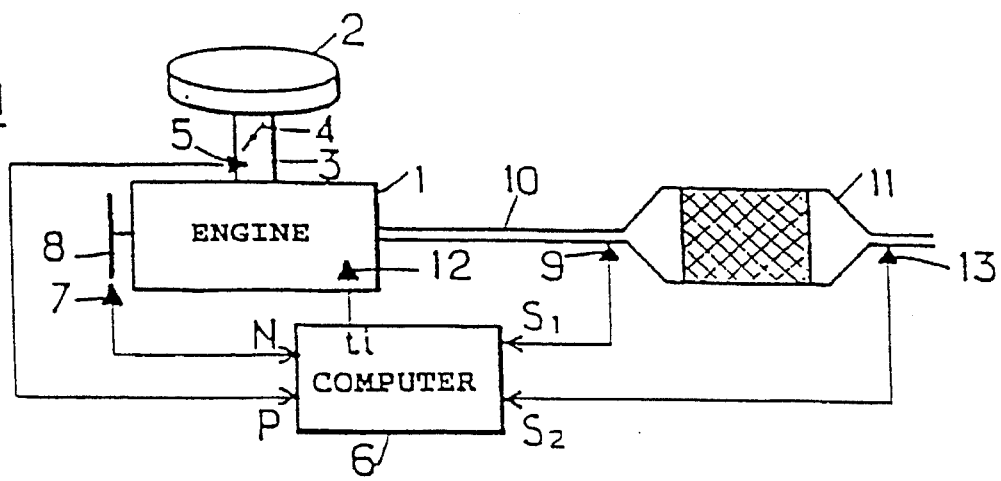
FIG.:1
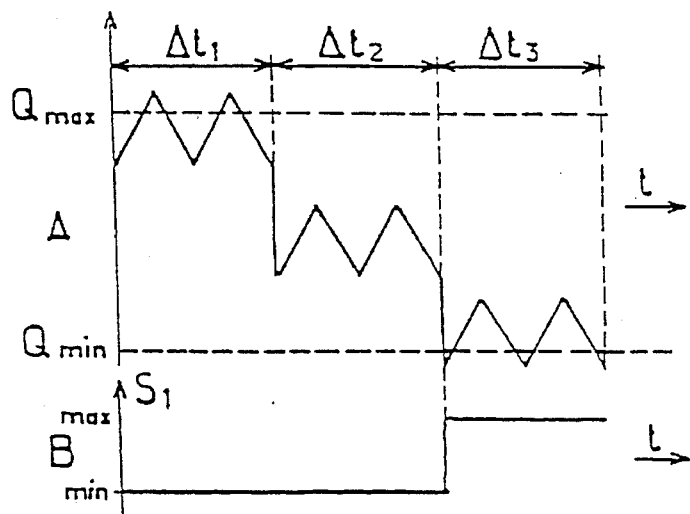
FIG.:4
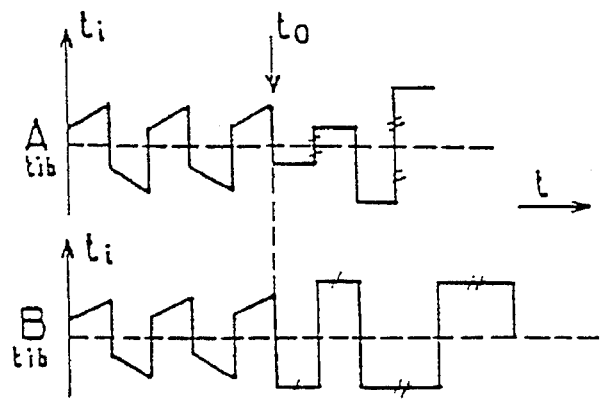
FIG.:5

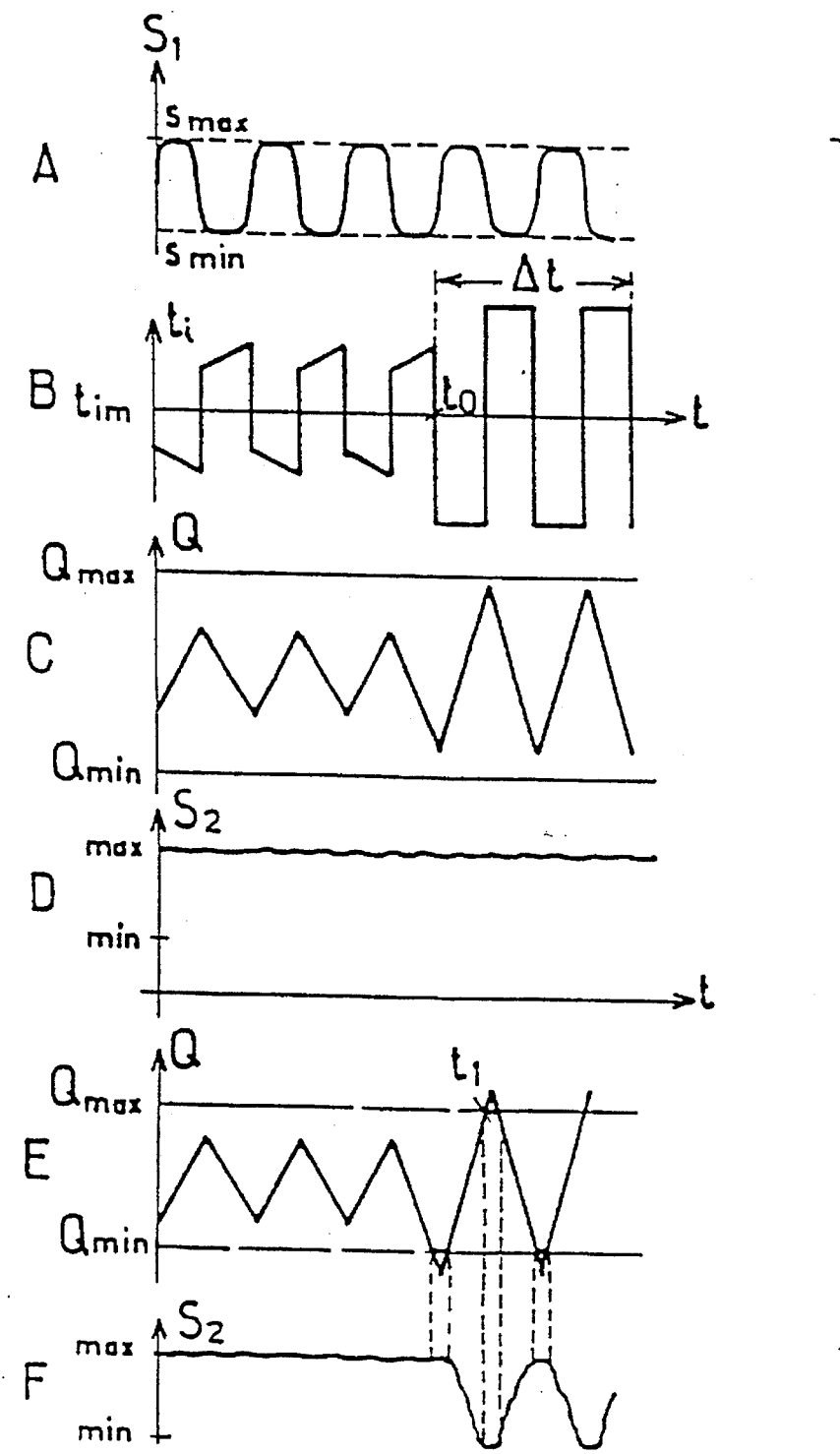
FIG.: 2

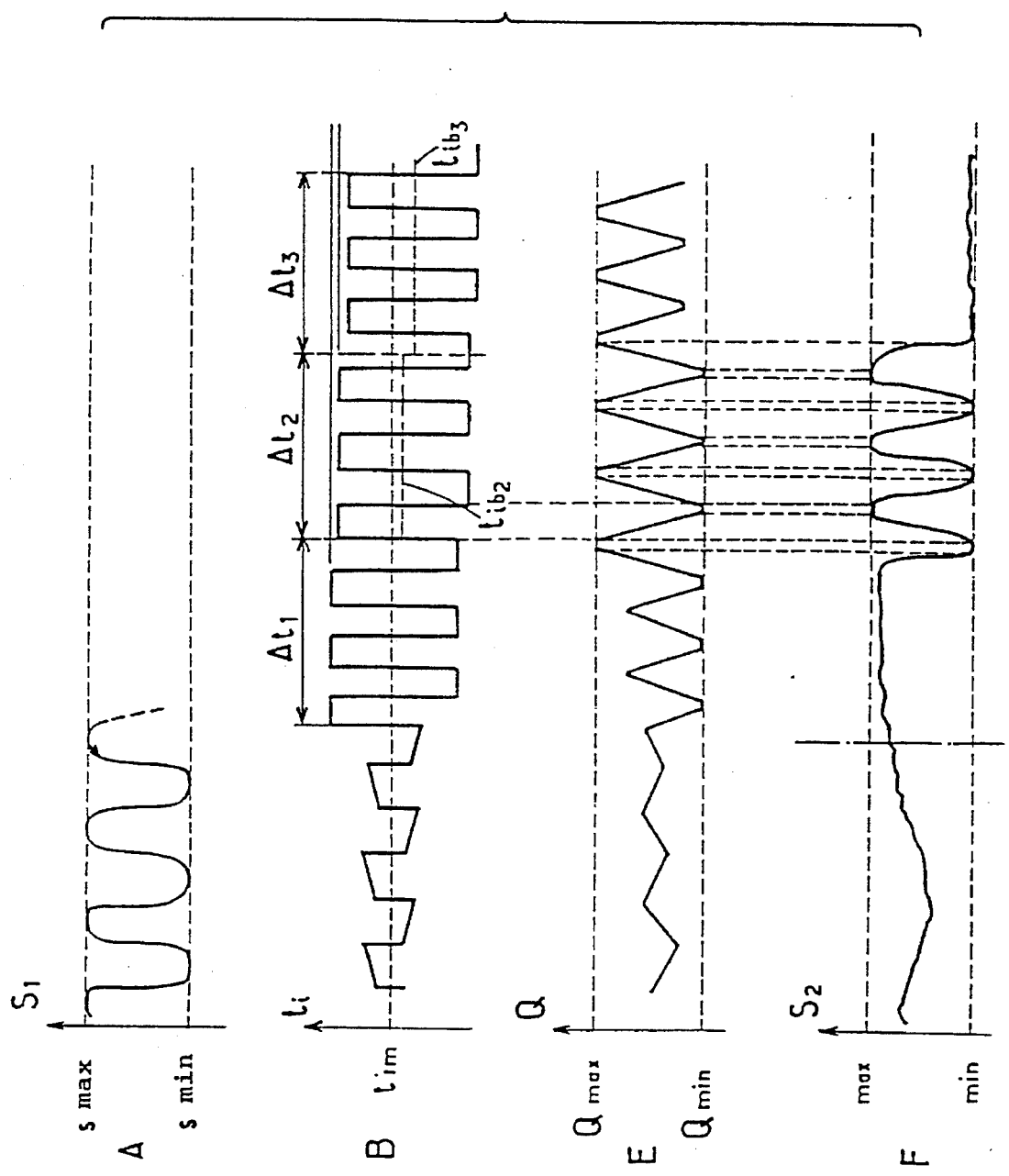

METHOD FOR MONITORING THE EFFICIENCY OF A CATALYTIC CONVERTER FOR TREATING EXHAUST GASES FROM AN INTERNAL COMBUSTION ENGINE

The present invention relates to a method for monitoring the efficiency of a catalytic converter for treating exhaust gases from an internal combustion engine equipped with a device for regulating the engine inlet air/fuel mixture and with at least one fuel injector whose opening time is controlled by this device.

Today motor vehicles propelled by an internal combustion engine are currently equipped with a device for regulating the composition of the engine inlet air/fuel mixture and with a catalytic converter arranged in the pipe of the exhaust gases of the engine in order to reduce or oxidise certain components of the latter into less noxious chemical species. The catalytic converter is said to be "three-way" when it oxidises carbon monoxide and unburnt hydrocarbons as well as reducing nitrogen oxides, produced by the combustion of the air/fuel mixture. To this end, the converter comprises, on a matrix made, for example, from ceramic, shaped in such a manner as to establish a maximum exchange surface with the exhaust gases, a coating comprising an oxidation catalyst metal such as platinum for example, a reduction catalyst metal such as rhodium for example and an oxygen storage metal such as cerium.

This coating degrades with time under the effect of "poisons" or attack such as for example the combustion of unburnt hydrocarbons in the catalytic converter following engine misfires. The active surface of the coating thus diminishes thereby lowering the overall efficiency of the catalytic converter.

Increasingly stricter anti-pollution standards now stipulate that motor vehicles are to be equipped with installed means for permanently monitoring the efficiency of the catalytic converter, so that degradation of this efficiency is detectable and so that a remedy is sought before this efficiency drops below a minimum admissible level.

Measuring the efficiency of a catalytic converter by its ability to store oxygen is known. In fact, it has been observed that the degradation of the oxygen-storage metal follows that of the other metals used in the catalytic converter. In order to measure the capacity of the converter to store oxygen, it has been proposed to arrange an oxygen probe downstream of the converter and to determine, from the signal supplied by this probe, the capacity of the converter to "smooth" the fluctuations in the oxygen concentration of the exhaust gases by absorption/resorption of oxygen.

To this end a method is known from the document U.S. Pat. No. 3,969,932 for monitoring the activity of a catalytic converter for treating the exhaust gases of an internal combustion engine equipped with a device for regulating the composition of the air/fuel mixture of the engine, which consists in arranging an oxygen probe at the inlet to the converter and another such probe at the outlet of the converter, in giving rise to a switching of the output signals of the oxygen probes by switching over the fuel richness of the air/fuel mixture inlet to the engine, from a high level to a low level, and in measuring the time offset between the switchings of the two probes, this offset being proportional to the quantity of oxygen that the catalytic converter is capable of storing. In fact, when the mixture is rich in fuel there is desaturation of the oxygen storer. When the mixture is then regulated to a "lean" level there is resaturation of the oxygen storer, the duration of this resaturation being proportional to the quantity of oxygen which the oxygen storer is capable of absorbing. By comparing the time offset in switchings of the two probes to a predetermined threshold, a correct state of the converter can thus be diagnosed if the offset is greater than the threshold, and an incorrect state in the opposite case.

The monitoring method described hereinabove suffers, however, two drawbacks. On the one hand, the measurement of the offset value is rendered inaccurate by the fact that the transition instants to be observed on the output signals of the oxygen probes are difficult to determine accurately. Moreover, the high richness transition to be operated in the implementation of the method necessarily means that the air/fuel mixture is far removed from stoichiometry, which generates atmospheric pollution.

The object of the present invention is thus to provide a method for monitoring the efficiency of a catalytic converter which method does not have these drawbacks.

The object of the present invention is also to provide such a method which enables the efficiency of the catalytic converted to be measured.

These objects of the invention are attained, as well as others which will appear from reading the description which follows, with a method for monitoring the efficiency of a catalytic converter for treating exhaust gases from an internal combustion engine equipped with a device for regulating the engine inlet air/fuel mixture and with at least one fuel injector whose opening time is controlled by this device, this method being noteworthy in that a) an oxygen probe whose output signal switches between two levels is arranged in the gas flow leaving the catalytic converter, b) during regulation and at a stabilised speed, the injector opening time suitable for ensuring stoichiometry of the air/fuel mixture is measured, c) next, during a predetermined time interval a time variation of symmetric deviation whose amplitude and shape is predetermined about a base opening time chosen from the opening time determined in step b) is imposed on the opening time, d) the base opening time used during successive time intervals is modified progressively and in a monotonic manner so as to pass through a centring of the deviation of the opening time on that of the oxygen storage capacity of the catalytic converter, and, e) from the possible appearance of an oscillation of this signal, an evaluation of the efficiency of the catalyst is drawn.

In order to detect a faulty catalytic converter, the deviation and the frequency of the time variation of the opening time are fixed at values corresponding to a minimum acceptable oxygen absorption capacity of the catalytic converter and insufficient capacity of the catalytic converter is diagnosed in the event of an oscillation appearing in the output signal of the oxygen probe during the progressive modification of the base opening time.

According to an advantageous characteristic of the method according to the invention, in order to measure the oxygen storage capacity of the catalytic converter, the amplitude and the frequency of the time variation of the opening time are fixed at a value lower than that which corresponds to the minimum acceptable oxygen absorption capacity of the catalytic converter, the base opening time is progressively modified in a direction suitable for unblocking the signal and, from the variation observed of the base opening time to cause the output signal of the probe to pass from a blocking at one of the levels to a blocking at the other level, a value is drawn for this base opening time suitable for centring the deviation of the quantity of oxygen stored which is engendered by the controlled deviation of the opening time, on the mean value of the quantity of oxygen which can be stored in the converter, and the base opening time is then fixed at the value thus calculated.

By virtue of this arrangement as will be seen in that which follows, the oxygen storage capacity of the catalytic converter can be measured with the aid of the amplitude of the deviation of the opening time which allows the limits of this capacity to be attained.

Other characteristics and embodiments of the method according to the invention will appear upon reading the description which follows and upon examination of the appended drawing in which:

FIG. 1 diagrammatically shows an internal combustion engine equipped with a device for regulating the air/fuel mixture and with a catalytic converter, the regulation device being improved by the addition of electronic means and software means designed for implementing the method according to the invention, FIG. 2 is a set of graphs useful for expounding the method according to the invention, FIG. 3 is a set of graphs useful for describing a method for detecting a faulty catalytic converter, according to the invention, FIG. 4 illustrates a method for referencing the limits of the oxygen storage capacity of the catalytic converter, prior to measuring this capacity, and FIG. 5 shows various graphs of time variations of the injector opening time which can be used in the method according to the invention in order to measure the oxygen storage capacity of the converter.

Brief reference will firstly be made to FIG. 1 of the appended drawing to describe the means necessary for implementing the method according to the present invention. This figure shows an internal combustion engine 1 equipped with an air filter 2, an air inlet duct 3 and a throttle valve 4 for regulating the inlet air flow rate, downstream of which there is an inlet pressure P sensor 5 which supplies a signal to a computer 6. A sensor 7 for the speed N of the engine, fixed facing a flywheel 8 of this engine, supplied a second signal to the computer. The latter receives a third signal $S_1$ supplied by an oxygen probe 9 placed in the pipe 10 of the exhaust gases of the engine, upstream of a three-way catalytic converter 11. The computer 6 comprises electronic signal processing, calculation and memory means necessary for controlling the opening time $t_i$, or injection time, of one or more fuel injectors 12. Traditionally, the assembly constitutes a closed-loop regulation device for this injection time, the loop being closed by the signal $S_1$ supplied by the oxygen probe 9. All the means described hereinabove are well-known and do not require a more detailed description.

In order to implement the present invention, there is added to these means a second oxygen probe 13, placed at the outlet of the catalytic converter 11. This probe is of the conventional type supplying a signal $S_2$ which switches between two levels when the oxygen content of the exhaust gases passes through a predetermined threshold. When such a probe is placed upstream of the catalytic converter, as is the case with the probe 9, the threshold corresponds to a composition of exhaust gases resulting from the combustion of a strictly stoichiometric air/fuel mixture.

The signal supplied by the probe 13 is used by the computer 6 for the purposes of the present invention. To this end, the computer is loaded with specific software suitable for executing the various stages of the method according to the invention, such as will now be described with reference to the graphs of FIGS. 2 to 4.

In FIG. 2, A shows the evolution in time of the output signal $S_1$ supplied by the probe 9 placed upstream of the catalytic converter 11, a signal traditionally used by the computer 6 in order to regulate, in a closed loop, the opening, or injection time $t_i$ of the injectors 12. B shows the conventional form of the signal supplied by the computer in order to control the opening of the injectors.

Furthermore, C shows the time evolution of the quantity of oxygen stored in the catalytic converter. It can be seen that this evolution is substantially in phase with that of the output signal of the probe 9 and of the injection time controlled by the computer. In fact, when the air/fuel mixture is "lean", that is to say when the fuel richness of the mixture is less than that which corresponds to stoichiometry of this mixture, the exhaust gas contains excess air, and thus excess oxygen, detected by the probe 9 whose output signal $S_1$ passes to a low level $s_{min}$. In parallel, the injection time $t_i$ is progressively increased by the computer in order to return to stoichiometry. However, for as long as the mixture is lean, the exhaust gas will contain excess oxygen, this excess oxygen being absorbed by the oxygen storer of the catalytic converter. It is clear that the quantity of oxygen contained in the catalytic converter increases when the mixture is lean, whereas it decreases when the mixture is rich, since the oxidation of unburnt hydrocarbons and carbon monoxide in the catalytic converter obliges the latter to give up the previously absorbed oxygen. These periodic evolutions in the quantity of oxygen stored in the converter can thus be diagrammatically represented by saw teeth, as shown in C of FIG. 2.

The present invention involves evaluating the oxygen storage capacity of the catalytic converter, that is to say the extent of the variation of the quantity of oxygen which can be contained in the converter, between the minimum quantity $Q_{min}$ corresponding to the point at which the converter can no longer give back oxygen and the maximum quantity $Q_{max}$ corresponding to the point at which the converter can no longer absorb oxygen. For a converter to be classed as being in a correct state, the ability of the converter to supply or to absorb oxygen must, in fact, be able to follow the variations in the composition of the exhaust gases, so that only non-noxious chemical species leave the catalytic converter.

In order to do this, according to the present invention, the computer 6 periodically initiates test phases of the catalytic converter. After having measured, at a stabilised speed of the engine, the value $t_{im}$ of the mean injection time as regulated by the computer in closed loop regulation, the computer controls, from an instant $t_0$ and for a predetermined time interval $\Delta t$, a forced, predetermined time variation of the injection time, obviously in open loop.

According to a first implementation of the present invention, this forcing can take the form of a symmetric deviation in the shape of a rectangular wave (FIG. 2,B), of predetermined amplitude and period, about the mean injection time $t_{im}$ determined previously. This forcing obviously reacts with the deviation of the quantity of oxygen stored in the converter. Two different situations can thus be observed.

The forced deviation of the injection time may be insufficient for the lower and upper limits of the quantity of oxygen which can be stored in the catalyst to be attained. This situation is illustrated by the graph C of FIG. 2. In this case, the output signal of the downstream probe 13 remains blocked at its maximum level, as shown in D.

If on the other hand, following a degradation of the catalyst converter for example, the forced deviation of the injection time is sufficient for the correlative deviation in the quantity of oxygen stored in the converter to be limited by the reduced storage capacity of the converter due to its degradation, a situation illustrated in E of FIG. 2 where the thresholds $Q_{max}$ and $Q_{min}$ are less widely spaced than in graph C of the same figure, the signal supplied by the downstream probe 13 switches, as shown in F of FIG. 2, each time the thresholds $Q_{min}$ and $Q_{max}$ of the oxygen storage capacity of the converter are crossed.

In fact, during the phase of forced variation of the injection time which corresponds to a fuel-lean, and thus rich in oxygen, mixture, the oxygen storer is charged with oxygen. When the maximum quantity $Q_{max}$ has been exceeded (see instant $t_1$ in E, FIG. 2), the exhaust gases which leave the converter remain loaded with oxygen which the probe 13 signals by switching to its low level corresponding to a fuel-lean mixture. The same reasoning applies in reverse when the level drops below the minimum quantity $Q_{min}$ resulting in the oscillations of the output signal of the probe 13 observed in F of FIG. 2.

Thus, by correctly adjusting the amplitude and period of the forced variation of injection time about a base injection time to a level corresponding to the minimum oxygen storage capacity in a catalytic converter which can be considered to be in a correct operational state, it can be deduced that the latter is faulty if, during a test of this converter, oscillations appear on the output signal $S_2$ of the probe 13. This test may be executed automatically and periodically by specific software in the memory of the computer 6, so that the driver of the vehicle is immediately warned when the catalytic converter is no longer able to correctly fulfil its role. Alternatively, the test may be executed only at the garage, during servicing of the vehicle.

As described previously, the method according to the invention supposes that the mean injection time evaluated in the regulation period is such that symmetrical variations of the injection time about this mean injection time allow symmetric limits $Q_{min}$ and $Q_{max}$ of the quantity of oxygen which can be stored in the catalytic converter to be attained. In fact, if the centring of the forced variation of the injection time is not as described hereinabove, the crossing of only one of the limits $Q_{min}$ or $Q_{max}$ will take place and the output signal of the probe will remain fixed at one of its two possible levels, without a definite conclusion being able to be drawn concerning the oxygen storage capacity of the catalytic converter.

According to a first implementation of the method according to the invention, this difficulty is overcome by applying the method illustrated in FIG. 3 (graphs A, B, E, F) which, as described in conjunction with FIG. 2, starts by measuring the mean injection time $t_{im}$, in a closed regulation loop and at a stabilised speed (see graph B). During a first time interval $\Delta t_1$ there is then controlled, in open loop, forced variations of this opening time about $t_{im}$, of deviation corresponding to the limits of the oxygen storage capacity of a catalytic converter considered as being in a correct operational state. If, as shown in FIG. 3, this deviation is off-centred so that only the lower limit $Q_{min}$ (see graph E) of the quantity of oxygen that can be stored is attained, the output signal $S_2$ of the oxygen probe 13 (see graph F) is blocked during the time interval $\Delta t_1$ at its high level (oxygen remains in the exhaust gases, at the outlet of the converter). Observing this blockage, during a following time interval $\Delta t_2$, the base injection time $t_{ib2}$ used is thus modified, in a direction which tends to unblock the signal. If then, as shown, the output signal of the probe 13 starts to oscillate, this is because the forced deviation in the injection time gives rise to the exceeding of the two limits $Q_{min}$ and $Q_{max}$ of the quantity of oxygen which can be stored in the catalytic converter. It can immediately be deduced therefrom that the variation $(Q_{max}-Q_{min})$ of this quantity, namely the current capacity of the catalytic converter, is too low and that the latter is thus faulty and must be replaced.

If, on the other hand, during the time interval $\Delta t_2$, the limits $Q_{min}$ and $Q_{max}$ are not attained, the output signal $S_2$ of the probe 13 remains blocked at the starting level: this signifies that the catalyst is capable of absorbing the minimum variation of the quantity of oxygen stored defining a catalyst in a correct operational state, provided that during a subsequent phase (time interval $\Delta t_3$), the output signal of the probe 13 switches from one level to the other following a new offset, still in the same direction, in the value $t_{ib3}$ of the base injection time taken as centre of the forced deviation of the opening time, the amplitude of this deviation remaining the same throughout the procedure. In fact it is this switching, during $\Delta t_3$, of the signal $S_2$ which validates the intermediate passage during $\Delta t_2$, of the deviation of the injection time in a zone which does not allow the limits $Q_{min}$ and $Q_{max}$ of the quantity of oxygen which can be stored in the catalytic converter to be attained.

Thus, during progressive and monotonic evolution of the base injection time used during the successive time intervals $\Delta t_1, \Delta t_2, \ldots \Delta t_n, \ldots$, a catalytic converter in a correct operational state is signalled by a clear and single switching of the output signal $S_2$ of the probe 13 whereas a faulty catalyst is signalled by the appearance, during an intermediate time interval such as $\Delta t_2$, of an oscillation in this signal.

According to an advantageous characteristic of the method according to the invention, not only can the oxygen storage capacity of the converter be compared to a predetermined minimum value, but the actual oxygen storage capacity can also be measured and thus the distance which separates the state of the converter from a limit state, which enables, for example, an estimation to be made of its useful life still available before its degradation attains an unacceptable level.

According to the present invention, to this end a procedure is supplied for indirectly detecting the limits $Q_{min}$ and $Q_{max}$ and for calculating the base injection time to be used in the method according to the invention. This procedure is illustrated in FIG. 4. According to the latter, in the event that a forced variation according to the invention of the injection time about the mean injection time calculated during a phase at stabilised speed with closed-loop regulation of this injection time, does not give rise to the switching of the output signal of the probe 13, the value of the base injection time is made to vary progressively during successive phases $\Delta t_1, \Delta t_2, \Delta t_3 \ldots$ etc., in a direction which brings the injection time deviation close to that which is capable of giving rise to a switching of the probe signal. In the case illustrated in A of FIG. 4, by way of an example, a deviation of the injection time of amplitude very much less than that which would cause the output signal of the probe 13 to oscillate if this deviation were centred as that represented in FIG. 2 (see graphs C and F) is used. During a first time interval $\Delta t_1$, only the maximum quantity $Q_{max}$ of oxygen stored can be crossed. The output signal of the probe 13 thus remains at its low level. The value of the base injection time is then lowered, with the same deviation, during a subsequent time interval $\Delta t_2$. Since no threshold has been crossed, the output signal of the probe 13 does not move. If, as shown, during a subsequent time interval $\Delta t_3$, the threshold $Q_{min}$ comes to be crossed, there is a switching of the output signal of the probe 13 to its high level. The computer can thus, from the various base injection times regulated during the three successive time intervals $\Delta t_1, \Delta t_2, \Delta t_3$, calculate a base injection time corresponding to the centring shown in FIG. 2. By way of an example, the arithmetic mean of the base injection times regulated during the extreme time intervals $\Delta t_1$ and $\Delta t_3$ can be taken.

Having thus acquired this base injection time, there will now be described, in conjunction with FIG. 4, two embodiments of the method according to the invention which allow the oxygen storage capacity of the converter to be measured. According to a first embodiment shown in FIG. 5, A, firstly the base injection time to be used is calculated using conventional means, during a phase of stabilised speed with closed-loop regulation, as described hereinabove. This injection time is then corrected if required as described in conjunction with FIG. 4. Then the forced variation in injection time is applied according to the invention. The forced variation illustrated in A of FIG. 5 consists in a symmetric deviation of the injection time about the base injection time, the amplitude of the deviation periodically increasing as shown. It is clear that this progressive increase of the deviation will allow the limits $Q_{min}$ and $Q_{max}$ of the quantity of oxygen which can be stored in the catalytic converter to be attained, as shown in FIG. 2, E. An oscillation of the output signal of the probe 13 thus warns the computer 6 that these limits have been attained. The computer then draws a measurement of the variation ($Q_{max} - Q_{min}$) of the quantity of oxygen which can be stored, that is to say the oxygen storage capacity of the catalytic converter from the amplitude of the deviation of the injection time attained at the time of the appearance of the oscillations.

Alternatively, as shown in FIG. 5, B, the forced deviation of the injection time could be of constant amplitude and increasing period. This is then the value of the period attained at the initiation of the oscillations of the output signal of the probe 13 which allows the oxygen storage capacity of the catalytic converter to be measured.

Of course, the invention is not limited to the embodiments described and shown which have only been given by way of example. Thus the forced oscillations of the injection time could develop in time in the form of waves other than rectangular ones, such as triangular or sinusoidal wave forms for example.

We claim:

1. A method for monitoring the efficiency of a catalytic converter for treating exhaust gases from an internal combustion engine, wherein the engine is equipped with at least one fuel injector and a device for regulating an engine inlet air/fuel mixture and an opening time of the fuel injector, the method which comprises:

a) disposing an oxygen probe in a gas flow leaving a catalytic converter, wherein the oxygen probe provides an output signal which switches between two levels;

b) measuring an injector opening time suitable for ensuring stoichiometry of an air/fuel mixture during regulation and at substantially stabilised speed, and choosing a base injection time from the measured injector opening time;

c) subsequently, during a predetermined time interval, imposing on the opening time a time variation of symmetric deviation having a predetermined amplitude and shape about the base injection time;

d) progressively and monotonically modifying the base opening time during successive time intervals, so as to pass through a centering of the deviation of the opening time on that of an oxygen storage capacity of the catalytic converter; and e) evaluating an efficiency of the catalytic converter by determining the resulting oscillation of the output signal.

2. The method according to claim 1, which further comprises fixing the deviation and a frequency of the time variation on the opening time at values corresponding to a minimum acceptable oxygen absorption capacity of the catalytic converter, and diagnosing insufficient capacity of the catalytic converter if an oscillation appears in the output signal of the oxygen probe during the step of modifying the base opening time.

3. The method according to claim 2, which further comprises diagnosing that the catalytic converter is in proper operational condition if the output signal of the oxygen probe switches between the two levels only once during the step of modifying the base injection time.

4. The method according to claim 1, which further comprises:

fixing an amplitude and a frequency of the time variation of the opening time at a value lower than a value corresponding to a minimum acceptable oxygen absorption capacity of the catalytic converter;

progressively modifying the base opening time in a direction suitable for unblocking the output signal of the probe;

from an observed variation of the base opening time, causing the output signal of the probe to pass from blocking at one level to blocking at the other of the two levels;

drawing a value for the base opening time suitable for centering the deviation of the quantity of oxygen stored which is engendered by the controlled deviation of the opening time, on the mean value of the quantity of oxygen which can be stored in the catalytic converter; and fixing the base opening time at the calculated value.

5. The method according to claim 4, which further comprises fixing a period of the time variation of the opening time about a fixed base time, constantly increasing the amplitude of the variation, and deducing a measure of the efficiency of the catalytic converter from the amplitude of the variation at an instant at which the output signal of the probe starts to oscillate.

6. The method according to claim 1, which further comprises fixing an amplitude of the time variation of the opening time about a fixed base time, increasing a period of the variation, and deducing a measure of the efficiency of the catalytic converter from a value of the period at an instant at which the output signal of the probe starts to oscillate.

* * * * *